United States Patent
Zhang

(10) Patent No.: US 9,933,559 B2
(45) Date of Patent: Apr. 3, 2018

(54) LIGHT GUIDE PLATE, BACKLIGHT MODULE, AND DISPLAY DEVICE

(71) Applicant: SHENZHEN CHINA STAR OPTOELECTRONICS TECHNOLOGY CO., LTD., Shenzhen (CN)

(72) Inventor: Yanxue Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/417,925

(22) PCT Filed: Dec. 31, 2014

(86) PCT No.: PCT/CN2014/095740
§ 371 (c)(1),
(2) Date: Jun. 8, 2016

(87) PCT Pub. No.: WO2016/090699
PCT Pub. Date: Jun. 16, 2016

(65) Prior Publication Data
US 2017/0269284 A1 Sep. 21, 2017

(30) Foreign Application Priority Data

Dec. 10, 2014 (CN) .......................... 2014 1 0752815

(51) Int. Cl.
*F21V 8/00* (2006.01)
(52) U.S. Cl.
CPC ......... *G02B 6/0061* (2013.01); *G02B 6/0036* (2013.01)

(58) Field of Classification Search
CPC .............................. G02B 6/001; G02B 6/0036
See application file for complete search history.

(56) References Cited

U.S. PATENT DOCUMENTS

2008/0259639 A1 10/2008 Chang
2012/0287665 A1* 11/2012 Hyakuta .............. G02B 6/0043
362/602

FOREIGN PATENT DOCUMENTS

CN 1396483 A 2/2003
CN 2567605 Y 8/2003
(Continued)

OTHER PUBLICATIONS

International Search Report (Form PCT/ISA/210) and Written Opinion (Form PCT/ISA/237) dated Sep. 23, 2015, by the State Intellectual Property of China in corresponding PCT/CN2014/095740. (11 pages).

(Continued)

*Primary Examiner* — David V Bruce
(74) *Attorney, Agent, or Firm* — Buchanan Ingersoll & Rooney PC

(57) ABSTRACT

A light guide plate, a backlight module, and a display device are disclosed. The light guide plate includes a main body, which includes a light-reflecting surface and a light-exiting surface, a first lattice portion arranged on the light-reflecting surface, and a second lattice portion arranged on the light-exiting surface. The light-exiting surface includes a lattice region formed on a peripheral portion thereof, and a central light-exiting region that is surrounded by the lattice region. The second lattice portion covers the lattice region. According to the present disclosure, the brightness of the peripheral portion of the light-exiting surface can be reduced effectively, and thus the display effect of the electronic products including the light guide plate can be improved.

18 Claims, 7 Drawing Sheets

(56) References Cited

FOREIGN PATENT DOCUMENTS

| | | |
|---|---|---|
| CN | 1766713 A | 5/2006 |
| CN | 101290372 A | 10/2008 |
| CN | 101655575 A | 2/2010 |
| CN | 201903665 U | 7/2011 |
| CN | 102221156 A | 10/2011 |
| CN | 202075447 U | 12/2011 |
| CN | 202794588 U | 3/2013 |
| JP | 2000-089032 A | 3/2000 |
| JP | 2001-276336 A | 10/2001 |

OTHER PUBLICATIONS

Office Action with Search Report dated Jan. 3, 2017, by the State Intellectual Property of China in corresponding Chinese Patent Application No. 201410752815.5 (6 pages).

* cited by examiner

LIGHT GUIDE PLATE, BACKLIGHT MODULE, AND DISPLAY DEVICE

CROSS REFERENCE TO RELATED APPLICATION

The present application claims benefit of Chinese patent application CN 201410752815.5, entitled "Light Guide Plate, Backlight Module, and Display Device" and filed on Dec. 10, 2014, which is incorporated herein by reference.

FIELD OF THE INVENTION

The present disclosure relates to the technical field of liquid crystal display, and particularly to a light guide plate, a backlight module comprising said light guide plate, and a display device comprising said backlight module.

BACKGROUND OF THE INVENTION

FIG. 1 schematically shows a structure of a backlight module in the prior art, wherein a path of a light transmitting in a light guide plate 1 is shown. As shown in FIG. 1, in the prior art, the backlight module consists of a Light-Emitting Diode (LED) light source 2 and a Light Guide Plate (LGP) 1. A main body of said light guide plate 1 comprises a light-exiting surface 12 (which can be seen as a top surface), a light-reflecting surface 11 (which can be seen as a bottom surface) that is opposite to said light-exiting surface 12, and four lateral surfaces (which are a first lateral surface 13, a second lateral surface 14, a third lateral surface, and a fourth lateral surface respectively) that are arranged between said light-exiting surface 12 and said light-reflecting surface 11. The whole region of the light-reflecting surface 11 is provided with lattice-points 111', while the light-exiting surface 12 is not provided with any lattice-point. In practical applications, such as a screen of a mobile phone comprising said backlight module, due to the coverage of a frame or other parts of the mobile phone, only part of the area in the light-exiting surface 12 of the light guide plate main body is a visible area. That is, the area of the light-exiting surface 12 that is not covered by the frame is the visible area.

With the development of consumer electronic products, the frames of these products, such as mobile communication products and tablet personal computers, are becoming increasingly narrow. In the designing of electronic products with a narrow frame, since the distance between the edge of the light guide plate 1 and the edge of the visible area is rather small, an edge reflective effect would be generated. As shown by the light transmitting path in FIG. 1, specifically, an arrow P1 in FIG. 1, the light, which is emitted by the LED light source 2, enters into the light guide plate main body through the first lateral surface 13 thereof, and refracts out through an edge of the light-exiting surface 12 of the light guide plate main body after the reflection of the second lateral surface 14 of the light guide plate main body, so that the edge reflective effect would be generated. The edge reflective effect would result in that the peripheral portion of the visible area looks brighter, and thus a striking bright belt surrounding the edge of the visible area would be resulted. Consequently, the display effect of the electronic products would be seriously affected.

A technical solution for eliminating the bright belt is proposed in the prior art, that is, a light-absorbing processing can be performed in the region of the light-exiting surface 12 where the bright belt could be generated. Specifically, in the above technical solution, black double-sided adhesive is applied on said region, or ink is sprayed thereon. By virtue of the light absorption effect of these black materials, the bright belt can be totally absorbed. However, the defect of this method lies in that the light-absorbing processing would inevitably result in light losses thereof.

SUMMARY OF THE INVENTION

In the designing of electronic products with a narrow frame comprising a backlight module in the prior art, since the distance between the edge of the light guide plate and the edge of the visible area is rather small, an edge reflective effect would be generated. The edge reflective effect would result in that the peripheral portion of the visible area looks brighter, and thus a striking bright belt surrounding the edge of the visible area would be resulted. Consequently, the display effect of the electronic products would be seriously affected. The purpose of the present disclosure is to solve the aforesaid technical problem.

In order to solve the aforesaid technical problem, the present disclosure provides a light guide plate, a backlight module comprising said light guide plate, and a display device comprising said backlight module.

The technical solution of the present disclosure provides a light guide plate, comprising: a light guide plate main body, comprising a light-reflecting surface and a light-exiting surface that is opposite to said light-reflecting surface, said light-exiting surface comprising a lattice region formed on a peripheral portion thereof, and a central light-exiting region that is surrounded by said lattice region; a first lattice portion arranged on said light-reflecting surface; and a second lattice portion arranged on said light-exiting surface and covering said lattice region.

Preferably, said second lattice portion further covers said central light-exiting region.

Preferably, said light-reflecting surface comprises a blank region that is opposite to said lattice region, and a central light-reflecting region surrounded by said blank region, said first lattice portion covering said central light-reflecting region.

Preferably, said first lattice portion covers a whole region of said light-reflecting surface.

Preferably, said light guide plate main body further comprises a plurality of lateral surfaces that are arranged between said light-reflecting surface and said light-exiting surface, at least one LED light source being provided on one of the lateral surfaces; and wherein said first lattice portion is arranged so that as a distance between first light guide points of said first lattice portion and said one of the lateral surfaces that is provided with the LED light source increases gradually, a radius of said first light guide points increases gradually, and a distance between said first light guide points decreases gradually.

Preferably, said second lattice portion is arranged so that as a distance between second light guide points of said second lattice portion and a center of a visible area of said light-exiting surface decreases gradually, a radius of said second light guide points decreases gradually, and a distance between said second light guide points increases gradually.

Preferably, an area of said lattice region accounts for 15% to 25% of an area of said light-exiting surface.

The technical solution of the present disclosure further provides a backlight module, comprising at least one LED light source and said light guide plate, on which said LED light source is provided.

The technical solution of the present disclosure further provides a display device, comprising the above backlight module.

Compared with the prior art, one embodiment or a plurality of embodiments of the present disclosure may have the following advantages or beneficial effects.

In the light guide plate of the embodiment of the present disclosure, since the second lattice portion is provided on the lattice region of the light-exiting surface, part of the light, which originally transmits out through the edge of the light-exiting surface, transmits to the center of the visible area of the light-exiting surface after one reflection or a plurality of reflections by the second lattice portion and the first lattice portion in sequence. In this manner, the brightness of the peripheral portion of the light-exiting surface can be reduced effectively, and thus the display effect of the electronic products comprising said light guide plate can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

In the designing of electronic products with a narrow frame comprising a backlight module in the prior art, since the distance between the edge of the light guide plate and the edge of the visible area is rather small, an edge reflective effect would be generated. The edge reflective effect would result in that the peripheral portion of the visible area looks brighter, and thus a striking bright belt surrounding the edge of the visible area would be resulted. Consequently, the display effect of the electronic products would be seriously affected. In order to solve the aforesaid technical problem, the embodiment of the present disclosure provides a light guide plate.

Figure 1:
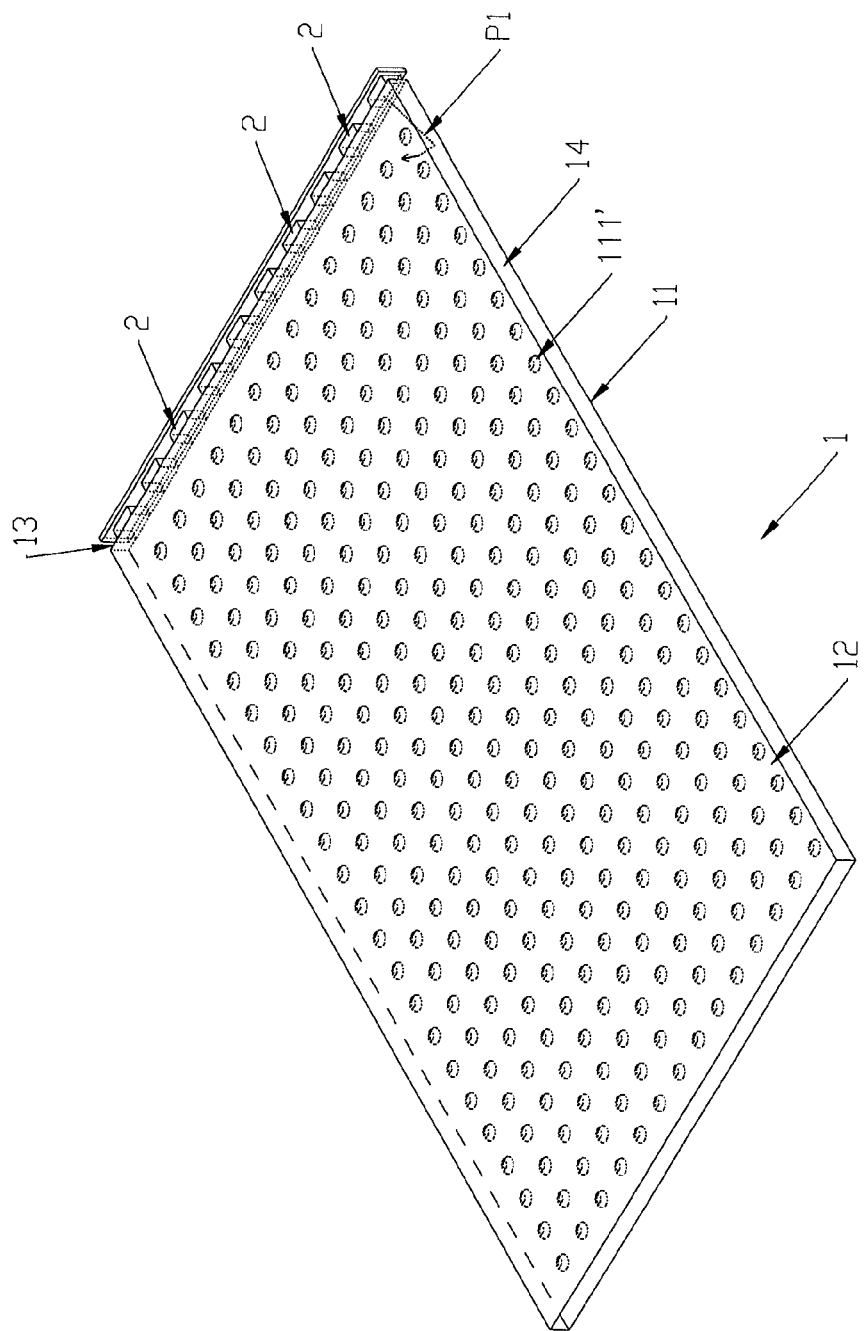
FIG. 1 schematically shows a structure of a backlight module in the prior art, wherein a path of a light transmitting in a light guide plate is shown.
Figure 2:
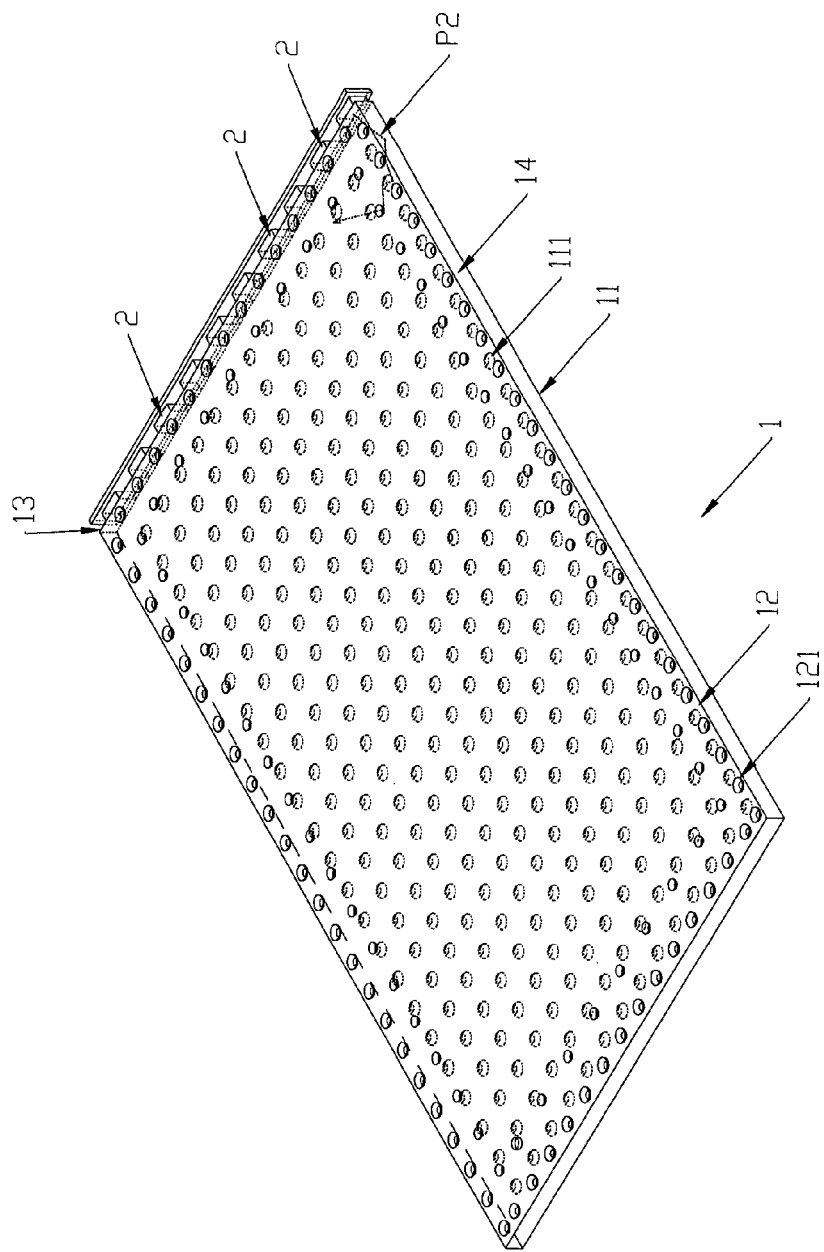
FIG. 2 schematically shows a structure of a light guide plate of one embodiment of the present disclosure, wherein a path of a light transmitting in the light guide plate is also shown.
Figure 3:
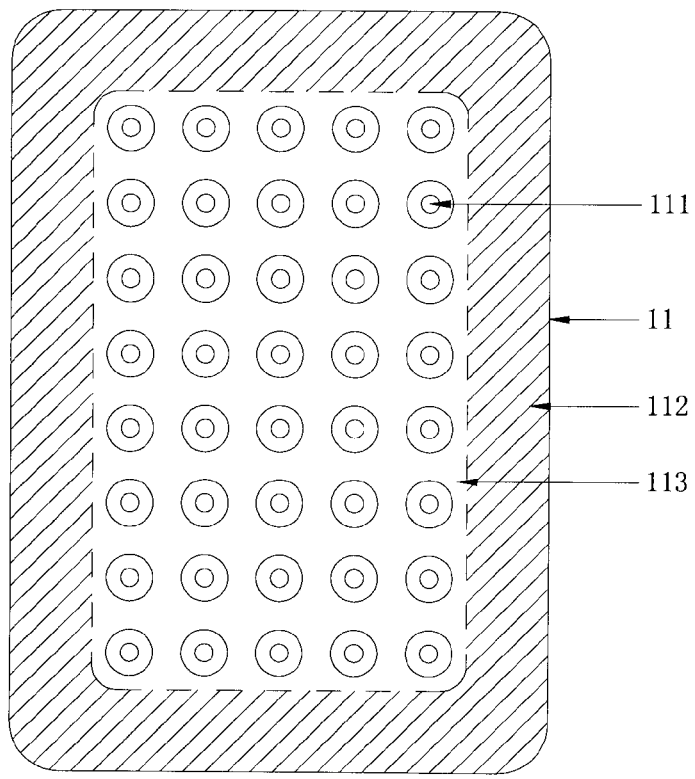
FIG. 3 schematically shows a lattice portion arranged on a light-reflecting surface of a light guide plate main body of the light guide plate as shown in FIG. 2.
Figure 4:
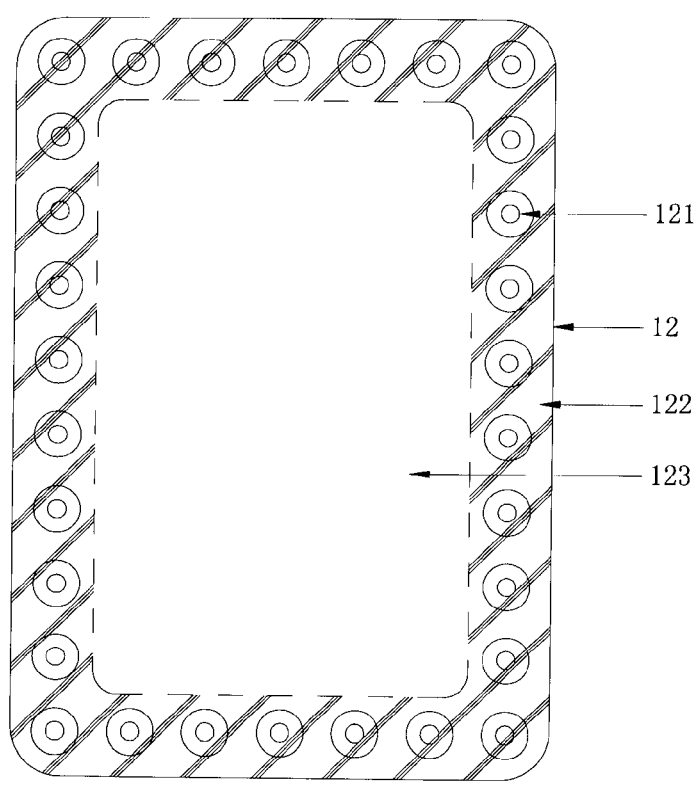
FIG. 4 schematically shows a lattice portion arranged on a light-exiting surface of a light guide plate main body of the light guide plate as shown in FIG. 2.

FIG. 2 schematically shows a structure of a light guide plate of Embodiment 1 of the present disclosure, wherein a path of a light transmitting in the light guide plate 1 is also shown. FIG. 3 and FIG. 4 schematically show arrangements of lattice portions on a light-reflecting surface 11 and a light-exiting surface 12 of the light guide plate as shown in FIG. 2 respectively. As shown in FIG. 2, FIG. 3, and FIG. 4, said light guide plate 1 comprises a light guide plate main body, a first lattice portion 111, and a second lattice portion 121.

Specifically, the light guide plate main body is generally made of optical grade acrylic (i.e., PMMA) or PC board. The light guide plate main body comprises a light-reflecting surface 11 (which can also be referred to as a bottom surface), a light-exiting surface 12 (which can also be referred to as a top surface), and a plurality of lateral surface. According to the present embodiment, there are four lateral surfaces, which are a first lateral surface 13, a second lateral surface 14, a third lateral surface, and a fourth lateral surface respectively. The light-exiting surface 12 is opposite to the light-reflecting surface 11, and the four lateral surfaces are provided between the light-exiting surface 12 and the light-reflecting surface 11. Moreover, all the lateral surfaces are perpendicular to the light-exiting surface 12 and the light-reflecting surface 11, and at least one LED light source 2 is provided on one of the lateral surfaces. According to the present embodiment, the LED light source 2 is provided on the first lateral surface 13.

Reference can be made to FIG. 3, wherein a first lattice portion 111 is arranged on the light-reflecting surface 11, and is constituted by a plurality of first light guide points. That is, the first light guide points are arranged in a regular or random manner, so that the first lattice portion 111 can be formed. Reference can be made to FIG. 4, where in a second lattice portion 121 is arranged on the light-exiting surface 12, and is constituted by a plurality of second light guide points. That is, the second light guide points are arranged in a regular or random manner, so that the second lattice portion 121 can be formed. In general, the first light guide points can be printed on the light-reflecting surface 11 with high-tech material which has a extremely high reflectivity and absorbs no light through ultraviolet ray screen printing technology, so that the first lattice portion 111 can be formed on the light-reflecting surface 11. Similarly, the second light guide points can be printed on the light-exiting surface 12 with high-tech material which has a extremely high reflectivity and absorbs no light through ultraviolet ray screen printing technology, so that the second lattice portion 121 can be formed on the light-exiting surface 12.

In addition, said light-exiting surface 12 comprises a lattice region 122 formed on a peripheral portion thereof, and a central light-exiting region 123 that is surrounded by said lattice region 122. In this manner, the whole region of the light-exiting surface 12 is divided into a shape similar to a square doughnut. That is, the region inside an inner loop of the square doughnut corresponds to said central light-exiting region 123, while the region outside the inner loop of the square doughnut corresponds to said lattice region 122. Said second lattice portion 121 covers said lattice region 122.

The advantages of the light guide plate 1 according to the present embodiment will be illustrated below with reference to the light transmitting path as shown in FIG. 2. Since the light-reflecting surface 11 and the light-exiting surface 12 of the light guide plate main body are provided with the first lattice portion 111 and the second lattice portion 121 respectively, and the second lattice portion 121 covers the peripheral portion of the light-exiting surface 12, i.e., the lattice region 122, part of the light emitted by the LED light source 2 provided on the first lateral surface 13 transmits as follows. Specifically, as an arrow P2 shown in FIG. 2, the light first enters into the light guide plate main body through the first lateral surface 13 thereof, reaches the light-exiting surface 12 after the reflection of the second lateral surface 14 of the light guide plate main body, reaches the light-reflecting surface 11 after the reflection of the second light guide points of the second lattice portion 121 provided on the light-exiting surface 12, reaches the light-exiting surface 12 after the reflection of the first light guide points of the first lattice portion 111 provided on the light-reflecting surface 11, then refracts out through the light-exiting surface 12 itself, and finally transmits to the center of the visible area of the light-exiting surface 12.

In the light guide plate 1 according to the embodiment of the present disclosure, since the second lattice portion 121 is provided on the lattice region 122 of the light-exiting surface 12, part of the light, which originally transmits out through the edges of the light-exiting surface 12, transmits to the center of the visible area of the light-exiting surface 12 after one reflection or a plurality of reflections by the second lattice portion 121 and the first lattice portion 111 in sequence. In this manner, the brightness of the peripheral portion of the light-exiting surface 12 can be reduced effectively, and thus the display effect of the electronic products comprising said light guide plate 1 can be improved.

In another preferred embodiment of the present disclosure, an area of said lattice region 122 accounts for 15% to 25%, more preferably, 20% of an area of said light-exiting surface 12. In some specific embodiments, the distribution of the lattice region 122 can be regulated by a person skilled in the art according to specific application environment, such as the locations of the LED light sources, so that the brightness of the peripheral portion of the light-exiting surface 12 can be reduced better.

It should be noted that, according to the present embodiment, the peripheral portion of the light-reflecting surface 11 of the light guide plate main body is maintained as blank. That is, said light-reflecting surface 11 comprises a blank region 112 that is opposite to said lattice region 122, and a central light-reflecting region 113 surrounded by said blank region 112. The blank region 112 corresponds to the lattice region 122 of the light-exiting surface 12 in vertical direction. Similar to the light-exiting surface 12, the whole region of the light-reflecting surface 11 is also divided into a shape similar to a square doughnut. That is, the region inside an inner loop of the square doughnut corresponds to said central light-reflecting region 113, while the region outside the inner loop of the square doughnut corresponds to said blank region 112. According to the present embodiment, the blank region 112 is the region where no lattice point is provided. Said first lattice portion 111 covers said central light-reflecting region 113. The benefit that can be brought about by the blank region provided on the peripheral portion of the light-reflecting surface 11 of the light guide plate main body lies in that the light reflectivity thereof can be reduced. In this case, the amount of light that is reflected to the peripheral portion of the light-exiting surface 12 can be reduced, and thus the brightness of the peripheral portion of the light-exiting surface 12 can be further reduced. However, if it is unnecessary to reduce the brightness of the peripheral portion of the light-exiting surface 12 to a large extent, the light-reflecting surface 11 needs not to be provided with a blank region on a peripheral portion thereof. That is, the brightness of the peripheral portion of the light-exiting surface 12 can be reduced completely through the reflection of the second lattice portion 121 of the lattice region 122 of the light-exiting surface 12. Here, in addition to the central light-reflecting region 113, the first lattice portion 111 also partially or totally covers the blank region 112. With respect to the technical solution of the first lattice portion 111 covering the blank region 112 completely, reference can be made to FIG. 5, wherein an arrangement of lattice points on a light-reflecting surface of a light guide plate main body according to Embodiment 2 of the present disclosure is shown. According to Embodiment 2 of the present disclosure, the first lattice portion 111 covers the whole region of the light-reflecting surface 11.

Figure 6:
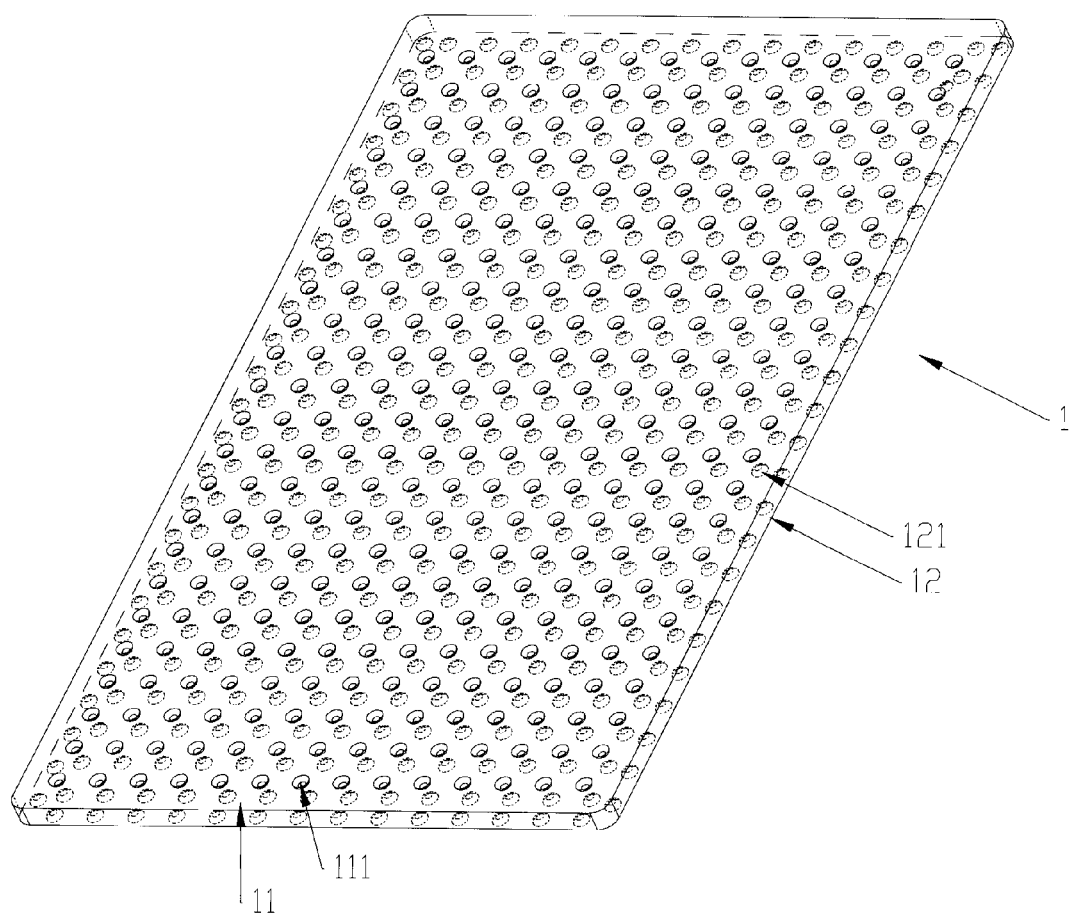
FIG. 6 schematically shows a structure of a light guide plate according to another embodiment of the present disclosure.
Figure 7:
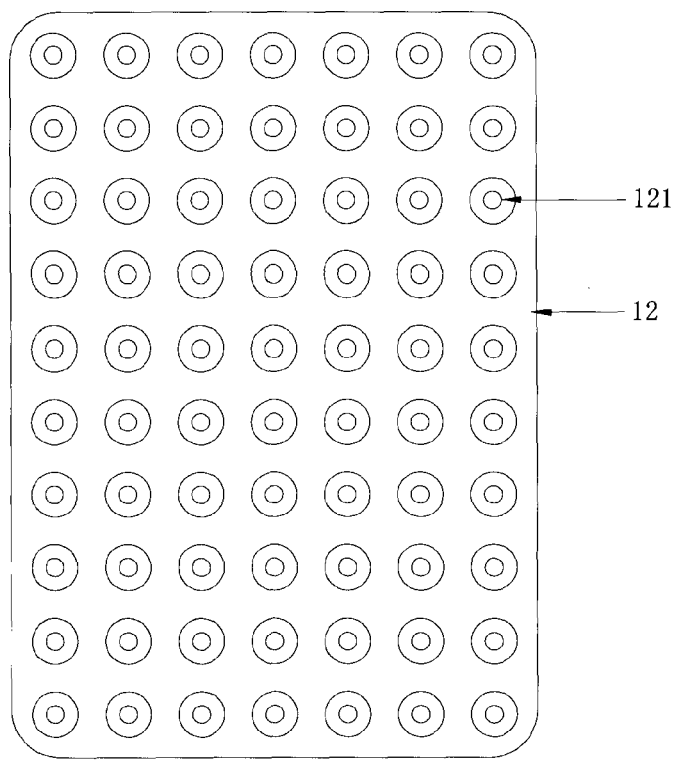
FIG. 7 schematically shows a lattice portion arranged on a light-exiting surface of a light guide plate main body of a light guide plate as shown in FIG. 6.

Similarly, the second lattice portion 121 may cover the lattice region 122 merely as shown in FIG. 4, or cover other regions of the light-exiting surface 12 in addition to the lattice region 122. That is, the brightness of the peripheral portion of the light-exiting surface 12 of the light guide plate main body can be reduced as long as the lattice region 122 is covered by the second lattice portion 121. Here, in addition to the lattice region 122, the second lattice portion 121 also partially or totally covers the central light-exiting region 123. With respect to the technical solution of the second lattice portion 121 covering the central light-exiting region 123 completely, reference can be made to Embodiment 3 of the present disclosure, which is shown in FIG. 6, FIG. 3, and FIG. 7. Among others, a structure of a light guide plate according to Embodiment 3 of the present disclosure is shown in FIG. 6. In the light guide plate main body shown in FIG. 6, the first lattice portion 111 of the light-reflecting surface 11 is arranged as shown in FIG. 3, and the second lattice portion 121 of the light-exiting surface 12 is arranged as shown in FIG. 7. According to the present embodiment, the first lattice portion 111 corresponding to the light-reflecting surface 11 is arranged the same as that in the above Embodiment 1. However, the difference thereof lies in that, in addition to the lattice region 122 of the light-exiting surface 12, the second lattice portion 121 further covers the central light-exiting region 123 of the light-exiting surface 12. That is, the second lattice portion 121 covers the whole region of the light-exiting surface 12. Since the number of the second light guide points involving in the light reflection thereof is increased, the brightness of the peripheral portion of the light-exiting surface 12 can be further reduced, and thus the display effect of the electronic products comprising said light guide plate 1 can be further improved accordingly.

Figure 5:
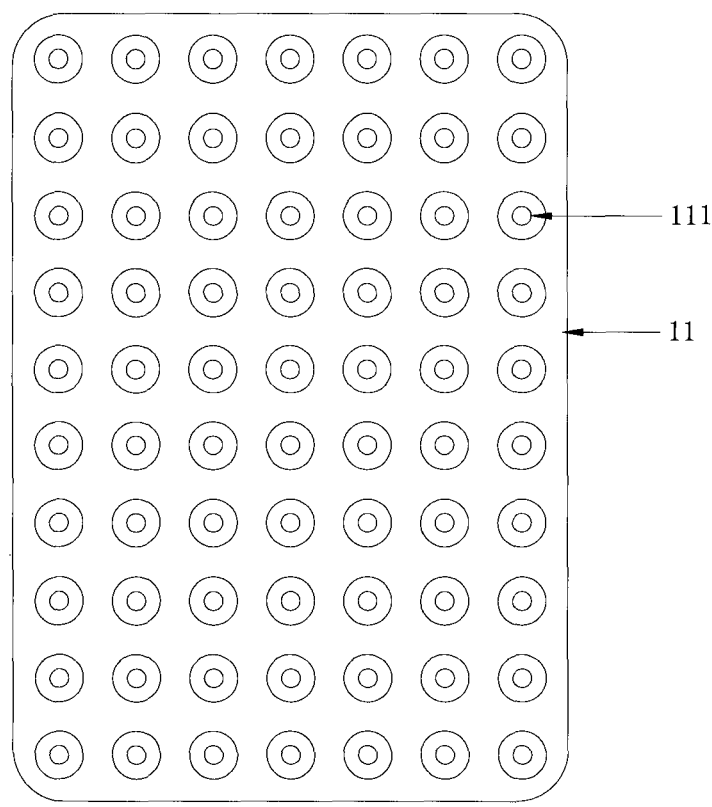
FIG. 5 schematically shows a lattice portion arranged on a light-reflecting surface of a light guide plate main body of a light guide plate according to another embodiment of the present disclosure.

In addition, the present disclosure further provides Embodiment 4. In the light guide plate main body according to Embodiment 4, the first lattice portion 111 of the light-reflecting surface 11 is arranged as shown in FIG. 5, and the second lattice portion 121 of the light-exiting surface 12 is arranged as shown in FIG. 7. Because of the reflection of the second lattice portion 121 of the lattice region 122 of the light-exiting surface 12, the brightness of the peripheral portion of the light-exiting surface 12 can be reduced also.

Figure 8:
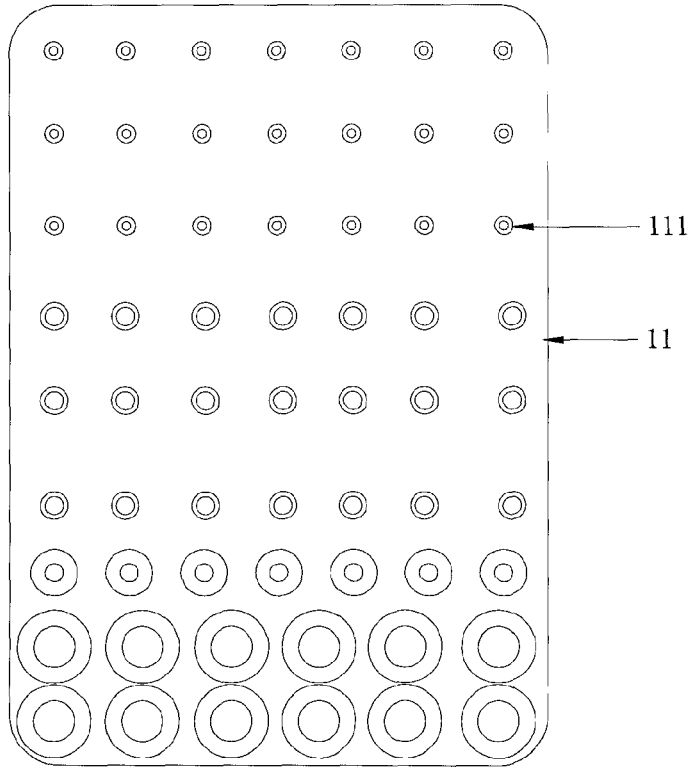
FIG. 8 schematically shows an arrangement of first light guide points constituting the first lattice portion according to an embodiment of the present disclosure.

In one preferred embodiment of the present disclosure, the sizes of the first light guide points which constitute the first lattice portion 111, and the distances thereof can be further optimized. As shown in FIG. 8, said first lattice portion 111 is arranged so that as a distance between the first light guide points of said first lattice portion 111 and said lateral surface that is provided with the LED light source 2, for example the first lateral surface as shown in FIG. 2, increases gradually, a radius of said first light guide points increases gradually, and a distance between said first light guide points decreases gradually. The larger the size of the light guide point is, the much the light can be reflected; and the closer the lattice points are arranged with respect to each other, the denser the light can be reflected, and thus the higher the intensity of the light reflected therein would become. Therefore, the larger the distance between the first light guide points and the lateral surface that is provided with the LED light source 2 is, the larger the radius of the first light guide points is, and the smaller the distance between said first light guide points is (i.e., the first lattice portion 111 is arranged in a denser manner), then the higher the probability of the light reflected by the region that is farther away from the lateral surface with the LED light source 2 would become, which would conducive to the uniformity of the light exiting from the light-exiting surface 12.

Figure 9:
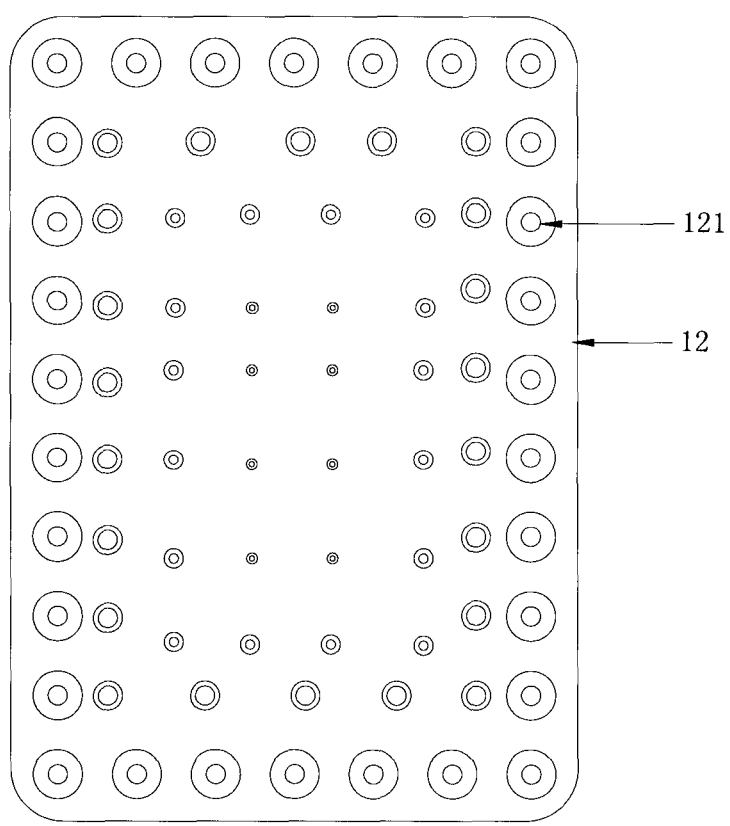
FIG. 9 schematically shows an arrangement of second light guide points constituting the second lattice portion according to an embodiment of the present disclosure.

In another preferred embodiment of the present disclosure, the sizes of the second light guide points, which constitute the second lattice portion 121, and the distances thereof can be further optimized. As shown in FIG. 9, said second lattice portion 121 is arranged so that as a distance between the second light guide points of said second lattice portion 121 and a center of a visible area of said light-exiting surface 12 decreases gradually, a radius of said second light guide points decreases gradually, and a distance between said second light guide points increases gradually. The reason for this structural design will be stated below. Generally speaking, the brightness of the center of the visible area should be high. Therefore, the smaller the distance to the center is, the less the light needs to be reflected would be. In this case, the probability of the light reflected by the region that is closer to the center would become lower, and thus the probability of the light exiting from the aforesaid region and transmitting to the center would become higher. In this manner, the uniformity of the light exiting from the light-exiting surface 12 can be ensured. Meanwhile, the probability of the light reflected by the region that is farther from the center would become higher, and thus the probability of the light exiting from the region and transmitting to the center would become lower. In this manner, the brightness of the peripheral portion of the light-exiting surface 12 can be effectively reduced.

It should be noted that, in the light guide plate 1 according to the embodiment, each of the first light guide points of the first lattice portion 111 can be arranged in a manner corresponding to a respective second light guide point of the second lattice portion 121. However, this arrangement is not necessary. The specific arrangement of the first and second light guide points can be adjusted according to actual needs during the implementing procedure.

Accordingly, an embodiment of the present disclosure further provides a backlight module, comprising said light guide plate 1 and at least one LED light source 2, which is provided on the light guide plate 1. The specific arrangement of the LED light source 2 on the light guide plate 1 can be adjusted according to actual needs during the implementing procedure. For example, as shown in FIG. 2, all LED light sources 2 are provided on one of the lateral surfaces of the light guide plate main body in sequence.

Moreover, an embodiment of the present disclosure further provides a display device comprising said backlight module, which can be used in electronic products such as mobile phones and tablet personal computers. A bright belt would not appear on the peripheral portion of the visible area of the screen of these electronic products, and thus the display effect and the whole performance thereof can be improved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A light guide plate, comprising:
   a light guide plate main body, comprising a light-reflecting surface and a light-exiting surface that is opposite to said light-reflecting surface, said light-exiting surface comprising a lattice region formed on a peripheral portion thereof, and a central light-exiting region that is surrounded by said lattice region;
   a first lattice portion arranged on said light-reflecting surface; and
   a second lattice portion arranged on said light-exiting surface and covering said lattice region.

2. The light guide plate according to claim 1, wherein said light guide plate main body further comprises a plurality of lateral surfaces that are arranged between said light-reflecting surface and said light-exiting surface, at least one LED light source being provided on one of the lateral surfaces; and
   wherein said first lattice portion is arranged so that as a distance between first light guide points of said first lattice portion and said one of the lateral surfaces that is provided with the LED light source increases gradually, a radius of said first light guide points increases gradually, and a distance between said first light guide points decreases gradually.

3. The light guide plate according to claim 1, wherein said second lattice portion is arranged so that as a distance between second light guide points of said second lattice portion and a center of a visible area of said light-exiting surface decreases gradually, a radius of said second light guide points decreases gradually, and a distance between said second light guide points increases gradually.

4. The light guide plate according to claim 1, wherein an area of said lattice region accounts for 15% to 25% of an area of said light-exiting surface.

5. The light guide plate according to claim 1, wherein said second lattice portion further covers said central light-exiting region.

6. The light guide plate according to claim 5, wherein said light guide plate main body further comprises a plurality of lateral surfaces that are arranged between said light-reflecting surface and said light-exiting surface, at least one LED light source being provided on one of the lateral surfaces; and wherein said first lattice portion is arranged so that as a distance between first light guide points of said first lattice portion and said one of the lateral surfaces that is provided with the LED light source increases gradually, a radius of said first light guide points increases gradually, and a distance between said first light guide points decreases gradually.

7. The light guide plate according to claim 5, wherein said second lattice portion is arranged so that as a distance between second light guide points of said second lattice portion and a center of a visible area of said light-exiting surface decreases gradually, a radius of said second light guide points decreases gradually, and a distance between said second light guide points increases gradually.

8. The light guide plate according to claim 5, wherein an area of said lattice region accounts for 15% to 25% of an area of said light-exiting surface.

9. The light guide plate according to claim 1, wherein said light-reflecting surface comprises a blank region that is opposite to said lattice region, and a central light-reflecting region surrounded by said blank region, said first lattice portion covering said central light-reflecting region.

10. The light guide plate according to claim 9, wherein said light guide plate main body further comprises a plurality of lateral surfaces that are arranged between said light-reflecting surface and said light-exiting surface, at least one LED light source being provided on one of the lateral surfaces; and wherein said first lattice portion is arranged so that as a distance between first light guide points of said first lattice portion and said one of the lateral surfaces that is provided with the LED light source increases gradually, a radius of said first light guide points increases gradually, and a distance between said first light guide points decreases gradually.

11. The light guide plate according to claim 9, wherein said second lattice portion is arranged so that as a distance between second light guide points of said second lattice portion and a center of a visible area of said light-exiting surface decreases gradually, a radius of said second light guide points decreases gradually, and a distance between said second light guide points increases gradually.

12. The light guide plate according to claim 9, wherein an area of said lattice region accounts for 15% to 25% of an area of said light-exiting surface.

13. The light guide plate according to claim 1, wherein said first lattice portion covers a whole region of said light-reflecting surface.

14. The light guide plate according to claim 13, wherein said light guide plate main body further comprises a plurality of lateral surfaces that are arranged between said light-reflecting surface and said light-exiting surface, at least one LED light source being provided on one of the lateral surfaces; and wherein said first lattice portion is arranged so that as a distance between first light guide points of said first lattice portion and said one of the lateral surfaces that is provided with the LED light source increases gradually, a radius of said first light guide points increases gradually, and a distance between said first light guide points decreases gradually.

15. The light guide plate according to claim 13, wherein said second lattice portion is arranged so that as a distance between second light guide points of said second lattice portion and a center of a visible area of said light-exiting surface decreases gradually, a radius of said second light guide points decreases gradually, and a distance between said second light guide points increases gradually.

16. The light guide plate according to claim 13, wherein an area of said lattice region accounts for 15% to 25% of an area of said light-exiting surface.

17. A backlight module, comprising at least one LED light source and a light guide plate, on which said LED light source is provided, said light guide plate comprising:
a main body of said light guide plate, comprising a light-reflecting surface and a light-exiting surface that is opposite to said light-reflecting surface, said light-exiting surface comprising a lattice region formed on an edge thereof, and a central light-exiting region that is surrounded by said lattice region;
a first lattice portion arranged on said light-reflecting surface; and
a second lattice portion arranged on said light-exiting surface, said second lattice portion covering said lattice region.

18. A display device, comprising a backlight module, said backlight module comprising at least one LED light source and a light guide plate, on which said LED light source is provided, said light guide plate comprising:
a main body of said light guide plate, comprising a light-reflecting surface and a light-exiting surface that is opposite to said light-reflecting surface, said light-exiting surface comprising a lattice region formed on an edge thereof, and a central light-exiting region that is surrounded by said lattice region;
a first lattice portion arranged on said light-reflecting surface; and
a second lattice portion arranged on said light-exiting surface, said second lattice portion covering said lattice region.

* * * * *